(12) United States Patent
Wnuk et al.

(10) Patent No.: US 11,058,975 B2
(45) Date of Patent: *Jul. 13, 2021

(54) FILTERING APPARATUS

(75) Inventors: Ralf Wnuk, Bexbach/Kleinottweiler (DE); Jörg Hermann Gerstner, Püttlingen (DE); Thomas Böttcher, Illingen-Hüttigweiler (DE); Thomas Morawietz, Homburg-Erbach (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 1338 days.

This patent is subject to a terminal disclaimer.

(21) Appl. No.: 13/261,770

(22) PCT Filed: Apr. 26, 2012

(86) PCT No.: PCT/EP2012/001773
§ 371 (c)(1),
(2), (4) Date: Dec. 5, 2013

(87) PCT Pub. No.: WO2012/150011
PCT Pub. Date: Nov. 8, 2012

(65) Prior Publication Data
US 2014/0091021 A1   Apr. 3, 2014

(30) Foreign Application Priority Data
May 5, 2011   (DE) .................. 10 2011 100 518.1

(51) Int. Cl.
*B01D 29/66* (2006.01)
*B01D 29/52* (2006.01)
(52) U.S. Cl.
CPC ........... *B01D 29/665* (2013.01); *B01D 29/52* (2013.01); *B01D 29/668* (2013.01)

(58) Field of Classification Search
None
See application file for complete search history.

(56) References Cited

U.S. PATENT DOCUMENTS 3,283,903 A    11/1966  Muller
3,380,591 A *   4/1968  Muller ................ B01D 29/114
                                                210/143
(Continued)

FOREIGN PATENT DOCUMENTS

DE        1 241 803         7/1963
DE        1801441 A1  *   6/1970   ............ B01D 35/12
(Continued)

OTHER PUBLICATIONS

English translation of DE1801441.*
English translation of DE4030084A1.*

*Primary Examiner* — Jason M Greene
*Assistant Examiner* — Eric J McCullough
(74) *Attorney, Agent, or Firm* — Wenderoth, Lind & Ponack, L.L.P.

(57) ABSTRACT

A filtering apparatus has filtering elements (11) in a filter housing (1), a filter inlet (7) and a filter outlet (9). During filtration, one of the filter elements (11) can be back-flushed by a back-flushing device (45, 49), having a pressure control device (19). The pressure control device has a hydraulic accumulator (19), with a fluid chamber (47) fillable during filtration with clean fluid and connectable for back-flushing via a back-flushing guide (45) to the clean side (29) of the filtering element (11) to be cleaned. For back-flushing, a further fluid chamber (48) of the hydraulic accumulator (19) is subjected to gas pressure. By resultant movement of a separator (59) of the hydraulic accumulator (19), the filling amount of the clean fluid is dispensed for the back-flushing.

14 Claims, 7 Drawing Sheets

(56) References Cited

U.S. PATENT DOCUMENTS

2002/0036177 A1* 3/2002 Ellard ............ B01D 24/002
 210/798
2010/0101269 A1* 4/2010 Theodore, Jr. ...... F04B 39/0207
 62/470

FOREIGN PATENT DOCUMENTS

DE   40 30 084 A1   3/1998
DE   103 25 525 A1   1/2005

* cited by examiner

FILTERING APPARATUS

FIELD OF THE INVENTION

The invention relates to a filtering apparatus having a plurality of filter elements accommodated in a filter housing having a filter inlet for fluid to be filtered and a filter outlet for the filtered fluid. At least one of the filter elements can be backwashed by a backwashing device for cleaning its effective filter surface during the filtration operation. The backwashing device includes a pressure control device for supporting the backwashing.

BACKGROUND OF THE INVENTION

A filtering apparatus of the same generic type is disclosed in DE 10 2007 054 737 A1. That filtering apparatus permits a continuous filtration operation. Filter elements that are to be regenerated are backwashed one after the other, while the filtration is continued through the remaining filter elements, so that the filtration operation is not interrupted at any time.

With the known filtering apparatus, the backwashing operation does not take place exclusively such that the system pressure applied in the filtering apparatus allows a substream of the filtrate to flow through the filter element to be cleaned in the reverse direction during the respective backwashing phase to release the dirt from the filter element and discharge it. Instead a vacuum is created by a pressure control device on the respective filter element being backwashed in an effort to also remove even more stubborn soiling. Therefore, not only is the system pressure in effect for the backwashing, but also a higher pressure gradient is available under the influence of the pressure control for releasing the soiling.

With the known filtering apparatus, the pressure control device has a cut-off element by which the fluid connection between the fluid to be filtered, flowing into the filter housing and the respective filter element to be backwashed can be cut off. This cutoff results in an interruption in flow in the case of the fluid flow entering the filter element before the backwashing operation. The velocity of flow prevailing in the cut-off operation then causes a suction effect as a hydrodynamic effect. Therefore, not only is the system pressure available for the backflow of filtrate on the clean side of the respective filter element, but also the backflow of filtrate is reinforced by the follow-up suction effect that is available because of the dynamic effect resulting from the cutoff of the flow entering from the dirty side.

However, the size of the hydrodynamic effect achieved by the cut-off process depends on the velocity of flow, and therefore, is limited accordingly. In areas of use where stubborn soiling that is difficult to release from the filter surface is to be expected, the then exists risk that the backwashing effect, which is hydrodynamically supported, is not completely satisfactory.

SUMMARY OF THE INVENTION

An object of the present invention is to provide an improved filtering apparatus in which an especially effective backwashing effect, supported by pressure control, can be achieved.

According to the invention, this object is basically achieved by a filtering apparatus having, as one important feature of the invention, a pressure control device having a hydraulic accumulator, in which its one fluid chamber can be filled with a quantity of cleaned fluid while the apparatus is operating in filtration operation and can be connected by a backwashing guide to the clean side of the respective filter element to be cleaned for a backwashing operation. In the case of a pressure application of the additional fluid chamber of the hydraulic accumulator, the resulting movement of the separation element of the hydraulic accumulator leads to ejection of the filling quantity of fluid, which reaches the filter element to be cleaned as flushing fluid by the backwashing guide.

Through the choice of the level of the gas pressure used in the hydraulic accumulator for the movement of the separation element, the velocity of flow of the flushing fluid reaching the filter element through the backwashing guide can be optimally adapted to the given conditions, i.e., to select it so that the best possible flushing effect is achieved in adaptation to the type of filter medium. In particular, in the case of relatively pressure-resistant filter elements such as conical or cylindrical slotted-sieve tube elements, a high pressure level, and thus, high velocities of flow can work in the hydraulic accumulator so that even stubborn soiling can be reliably released from the filter surface.

In advantageous exemplary embodiments, the additional fluid chamber of the hydraulic accumulator can be connected to a compressed gas source for the backwashing operation by a valve control device. In many cases, the use of compressed air may be especially advantageous, for example, when the filtering apparatus is operated in combination with installations or equipment in which a compressed air supply is provided.

The additional fluid chamber of the hydraulic accumulator for the backwashing operation can preferably be connected to a compressed gas source by a valve control device. In especially advantageous exemplary embodiments, a flushing gas tank situated outside of the filter housing is provided as the compressed gas source. Without any negative effect on the compactness of the filtering apparatus, a large gas volume kept on hand for the respective backwashing operations can then be made available through a tank precharged with compressed air, for example.

The valve control device may have a fast-opening valve in a flushing gas line leading from the compressed gas source to the hydraulic accumulator in an especially advantageous manner. Due to a very rapid application of pressure, a greatly accelerated movement of the separation element of the hydraulic accumulator can then be achieved. A pressure surge is then generated for the backwashing operation, thereby releasing even stubborn soiling from the filter surface.

A pneumatically operable diaphragm valve may advantageously be provided as a very fast-opening valve in the flushing gas line.

In especially advantageous exemplary embodiments, the hydraulic accumulator and backwashing guide are connected to one another and arranged in a rotatable manner in the filter housing, and can be rotated by a rotational drive for adjustment movements between filtration operations and backwashing. Such arrangement permits an especially simple and compact design in that a drive, preferably in the form of an electric geared motor mounted on a readily accessible free end of the hydraulic accumulator. By this drive, the hydraulic accumulator can be adjusted to rotational positions in which the backwashing guide forms the fluid connection to the filter element to be cleaned.

In a particularly advantageous manner, the hydraulic accumulator may be a piston accumulator that can rotate about the cylinder axis together with the backwashing guide arranged on one end of the cylinder. In comparison with other accumulator designs, such as a diaphragm accumulator, a spring accumulator, a bellows accumulator or the like, the piston accumulator is characterized not only by a particularly robust design but also by a good ratio between design size and the capacity for holding cleaned fluid. That capacity corresponds to the total displacement of the piston, and thus, corresponds approximately to the total volume of the accumulator cylinder.

In a particularly advantageous manner, the filter elements may be accommodated in their own element chamber. These element chambers are arranged in the filter housing on a circular line concentrically surrounding the cylinder axis. With this concentric arrangement, the connection of the individual element chambers to the rotatable backwashing guide can have a particularly simple design.

In a particularly advantageous manner, the hydraulic accumulator may be situated between the element chambers surrounding it in such a way that the fluid chambers of the hydraulic accumulator are located between the chamber connections of the element chambers situated at the ends of the filter elements. This arrangement, in which the hydraulic accumulator is integrated between the respective inlet and outlet of the element chambers, permits an especially compact design of the overall apparatus with an especially advantageous ratio between the required design height and the achievable size of the usable filter surface area.

In particularly advantageous exemplary embodiments, an input space having the filter inlet and forming the crude side in the filtration operation and a separate output space forming the clean side in the filtration operation and connected to the filter outlet are present in the filter housing between the hydraulic accumulator and the surrounding element chambers. The first space of which is connected to the chamber connection on the crude side. Its second space of each element chamber is connected to the chamber connection of the element chambers in filtration operation on the clean side.

This arrangement may advantageously also be such that an overflow space connected to the clean side chamber connections of the element chambers is provided in the filter housing and is connected to the output space. In a rotational position of the hydraulic accumulator corresponding to the filtration operation, the first fluid chamber of this output space can be filled with cleaned fluid through a filling hole provided in the wall of the backwashing guide.

On the other hand, in other rotational positions of the hydraulic accumulator, which correspond to the backwashing of an element chamber, the backwashing guide is connected to the chamber connection of the element chamber to be backwashed on the clean side. A backwashing arm, which is arranged on the end of the cylinder of the hydraulic accumulator opposite the backwashing guide and which can be rotated together with the hydraulic accumulator, then connects the chamber connection of the element chamber to be backwashed on the crude side to a backwashing line for the outflow of a backwashing quantity at the same time.

A motor-operated backwashing valve may be arranged in the fluid connection between the backwashing arm and the backwashing line. This valve preferably can be a ball valve that is rotated by a pneumatic drive.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
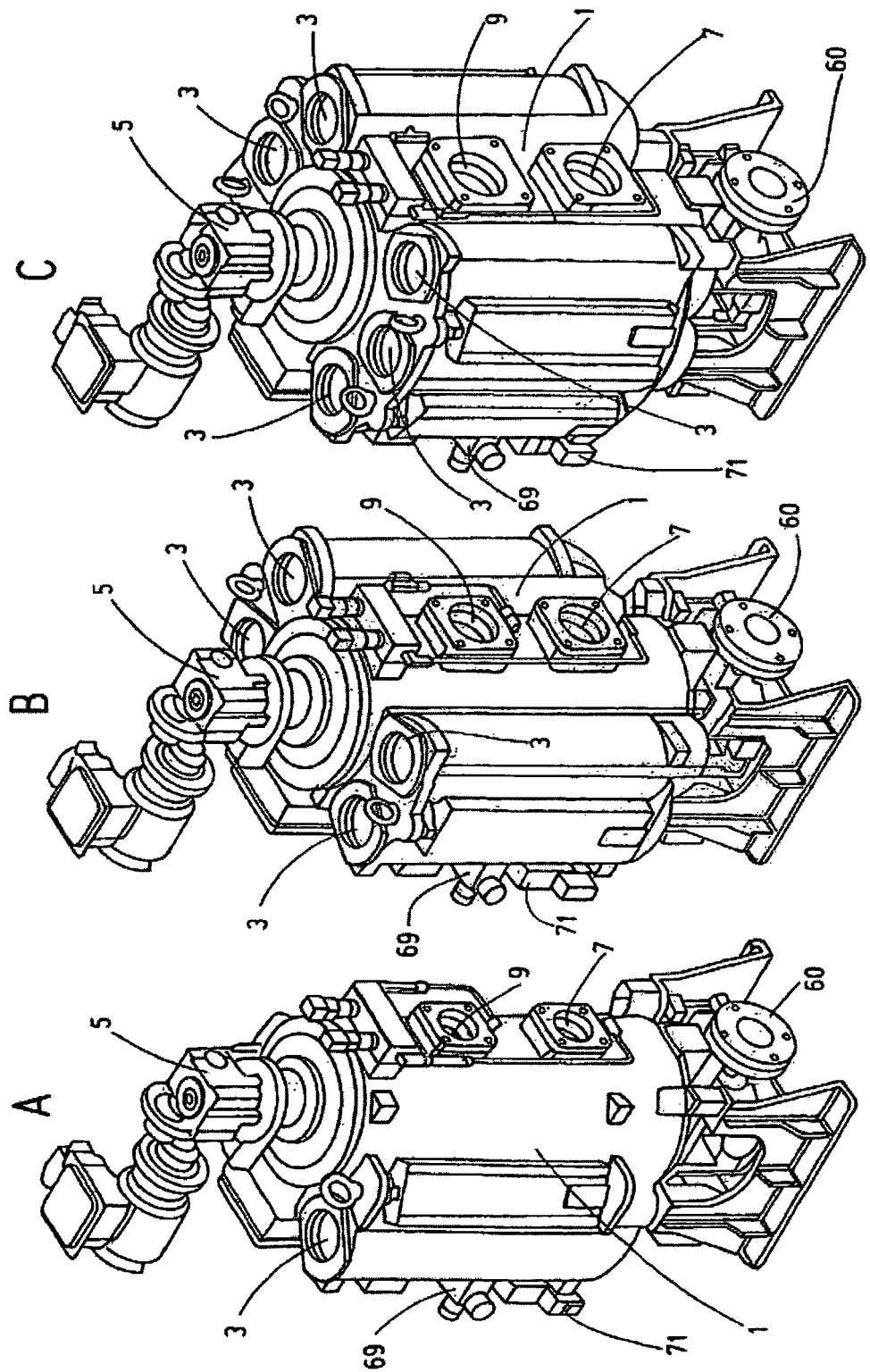
FIGS. 1A through 1C are perspective views of the filtering apparatus according to first, second and third exemplary embodiments of the invention, shown in simplified schematic diagrams, having two or four or six filter element chambers, respectively.

FIG. 1 shows an overall view of the filtering apparatus according to the invention in the partial FIGS. 1A through 1C having a housing main part 1, filter element chambers 3 and a drive part 5. An inlet 7 is provided on the main part 1 for the supply of fluid to be cleaned along with an outlet 9 for cleaned fluid. FIG. 1 also illustrates that the apparatus according to the invention can be designed in the manner of a modular building block system for operation with different numbers of filter elements. FIG. 1A shows an example having two filter element chambers 3, in which one filter element 11 (FIGS. 4 and 5) can be accommodated, while FIG. 1B shows an example with four filter element chambers 3, and while FIG. 1C shows an example with six element chambers 3. Multiple filter elements 11 may also be provided in each element chamber 3, each in the form of a filter cartridge, for example, as is the case in the present embodiment.

Figure 2:
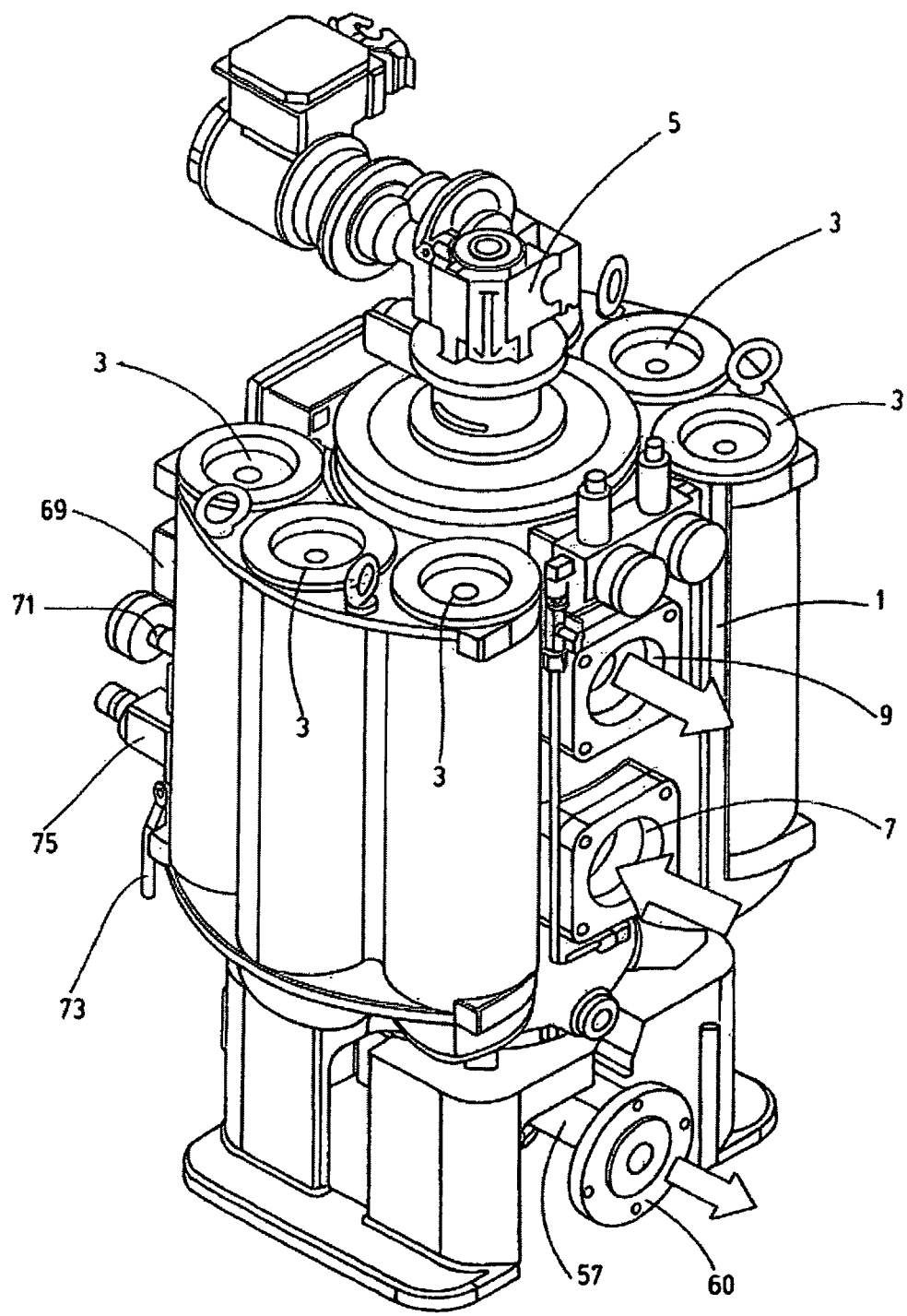
FIGS. 2 and 3 are perspective views, drawn on a larger scale, of the filtering apparatus of FIG. 1C with six filter element chambers as seen toward the front side and the rear side of the apparatus, respectively.
Figure 3:
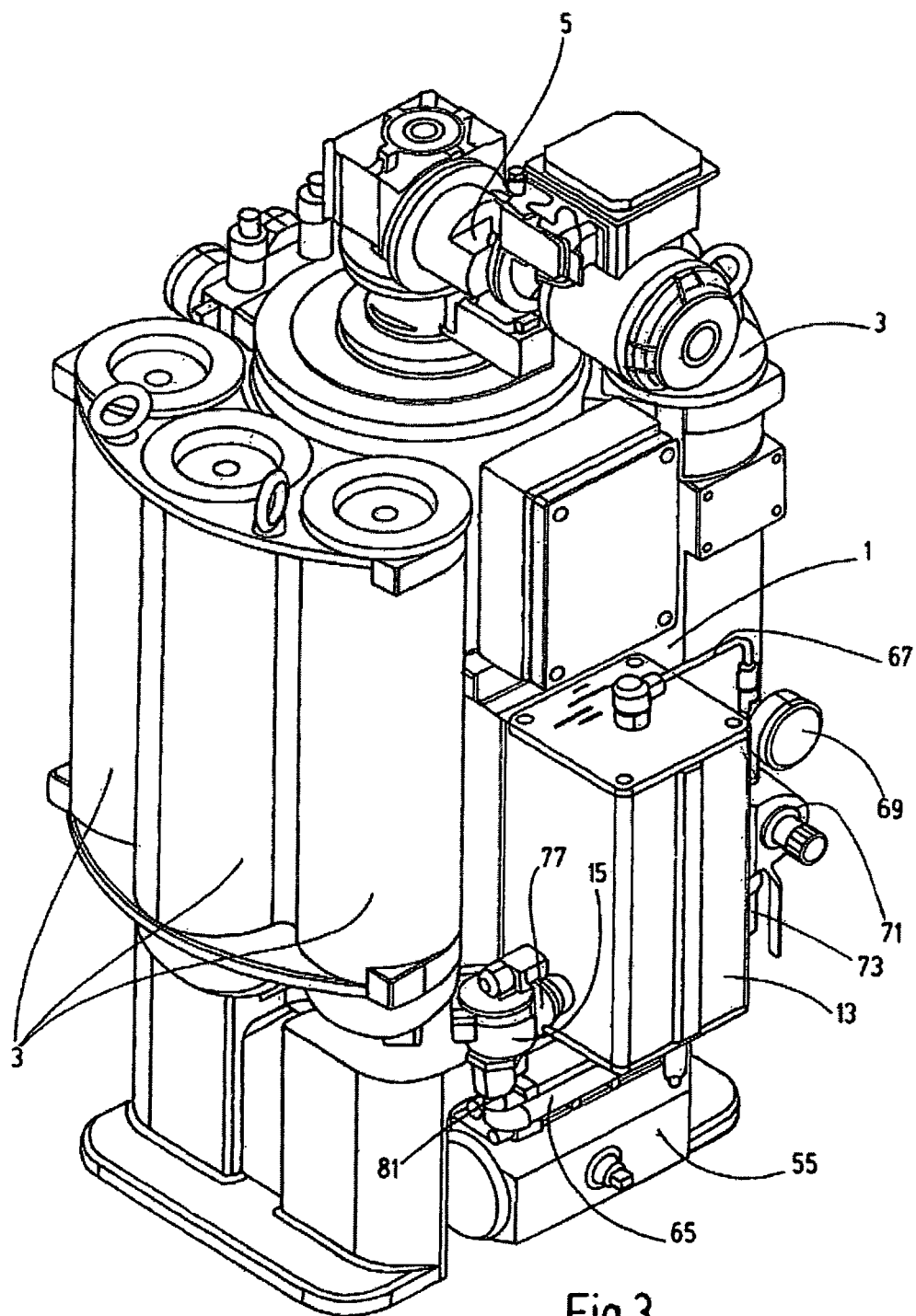

FIGS. 2 and 3 show the embodiment of the filtering apparatus with six element chambers 3, with FIG. 2 showing the front side with the inlet 7 and the outlet 9, while FIG. 3 shows the opposite rear side, on which a flushing gas tank 13 is mounted. A diaphragm control valve 15 is connected to the flushing gas tank 13, is shown in an individual diagram in FIG. 7 and is pneumatically operable. A flushing gas line 17 is connected to the diaphragm valve 15. The apparatus can be supplied with pressurized flushing gas through this flushing gas line, as will be discussed in greater detail with reference to FIGS. 4 through 6.

Figure 4:
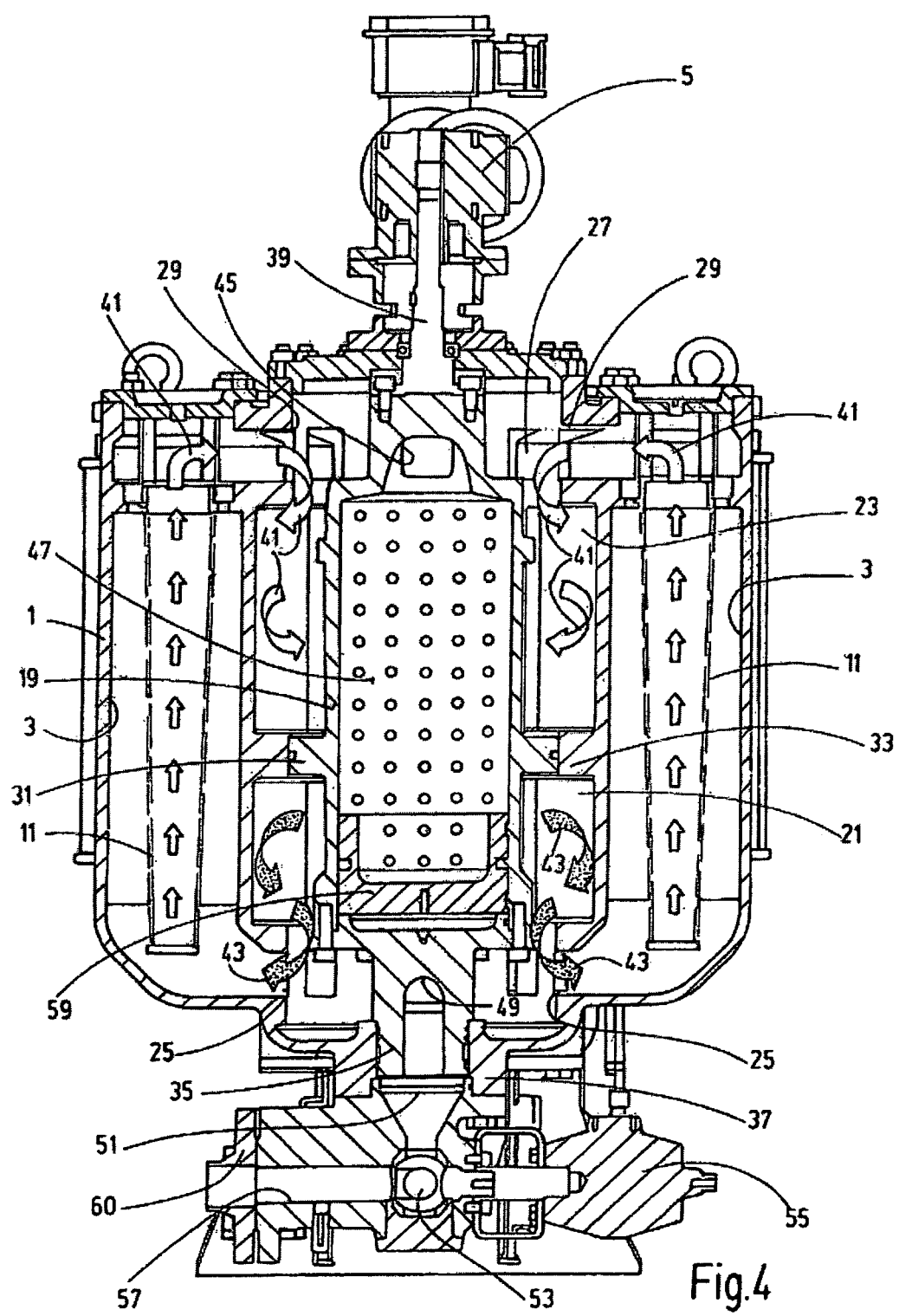
FIG. 4 is a side view in section of the filtering apparatus of FIGS. 2 and 3, illustrating the operating state of filtration operation.
Figure 5:
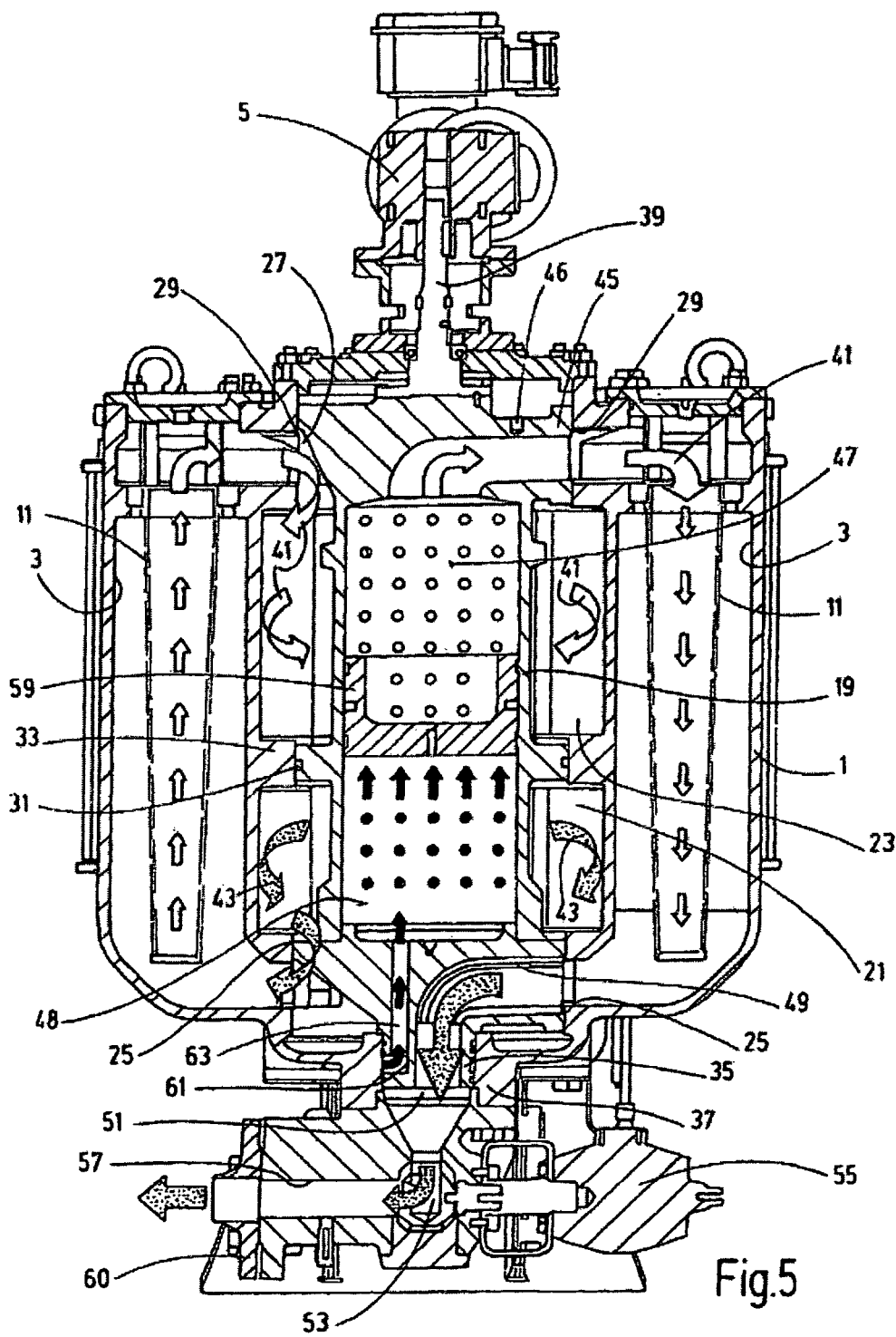
FIG. 5 is a side view in section of the filtering apparatus of FIGS. 2 and 3, illustrating the operating state of backwashing of the element chamber visible on the right side.

Of these, FIGS. 4 and 5 each show a longitudinal section of the device. FIG. 4 shows the operating state of the filtration operation. FIG. 5 shows the condition in backwashing the filter element 11, which is in the element chambers 3 shown at the right of FIG. 5. As indicated most clearly in FIGS. 2 and 3, the element chambers 3 are arranged on a circular line so that they surround concentrically a hydraulic accumulator situated between them. As shown in FIGS. 4 and 5, the hydraulic accumulator is formed by a piston accumulator 19. As FIGS. 4 and 5 also show, an input space 21, which is connected to the housing inlet 7, and an output space 23, which is connected to the outlet 9 of the housing, are provided in the housing main part 1 between the element chambers 3 and the piston accumulator 19. The input space 21 is connected to the crude-side chamber connection 25 of the element chambers 3 in filtration operation (shown at the bottom of FIGS. 4 and 5). The output space 23 is connected to an overflow space 27 at the end, which is at the top in FIGS. 4 and 5. The clean-side chamber connections 29 of the element chambers 3, which are in filtration operation, are in turn connected to the output space, as shown in FIG. 4, which illustrates the status of the filtration operation. As indicated with dotted arrows 43 in FIG. 4, the unfiltered fluid from the input space 21 flows through the chamber connections 25 into the element chambers 3 and flows through the filter elements 11 from the outside to the inside, from which the filtered fluid then flows through the chamber connections 29 on the clean side to the overflow space 27. From overflow space 27, the filtrate flows to the output space 23, as indicated by the arrows 41, leaving this space through the outlet 9.

The piston accumulator 19 is rotatable about its cylinder axis between the input space 21 and the output space 23. A sealed rotational bearing 31 is provided on a housing shoulder 33 separating the input space 21 from the output space 23. Another sealed rotational bearing 35 is situated on a bottom part 37 that seals the housing at the bottom. For adjusting the piston accumulator 29 to the desired rotational positions, the piston accumulator 19 is coupled by a driveshaft 39 to the drive part 5, which is an electric geared motor with an integrated rotational position sensor. As can be seen in particular with the rotational position of the piston accumulator 19 shown in FIG. 5, piston accumulator 19 has a backwashing guide 45 on the cylinder end at the top in the drawing, extending cantilevered from the cylinder space 47 to the chamber connection 29 on the clean side of the element chamber 3 to be backwashed, which is the element chamber 3 visible on the right side in the diagram in FIG. 5. On the lower end of the piston accumulator 19, the latter has a backwashing arm 49, which has a similar cantilevered design like that of the upper backwashing guide 45, but extends from the chamber connection 25 on the crude side of the element chamber 3 to be backwashed to a backwashing output 51 for the discharge of the backwashing quantity with the entrained sludge. As indicated with the arrows 43, the backwashing quantity loaded with sludge goes through a backwashing valve in the form of a ball valve 53, which is rotatable by a pneumatic drive 55 to a backwashing line 57 and to an output flange 60.

During the filtration operation as illustrated in FIG. 4, the piston accumulator 19 is in a rotational position in which the backwashing guide 45 is not arranged on a chamber connection 29 of an element chamber 3 to be backwashed. In this operating state, filtrate flows out of the overflow space 27 and into the cylinder space 47 of the piston accumulator 19 through a filling hole 46 (FIG. 5) formed in the wall of the backwashing guide 45 and having a graduated diameter to form a narrow inlet opening, filling this cylinder space 47 while the piston 59 of the piston accumulator 19 moves downward into the position shown in FIG. 4. In this rotational position, which is shown in FIG. 4 and corresponds to the filtration operation, the cylinder space 48 situated on the bottom side of the piston 59 is vented because the input 61 of a feed channel 63 for flushing gas, which is visible only in FIG. 5, is in a corresponding position with a venting groove (not shown) in the bottom part 37 of the housing.

Figure 6:
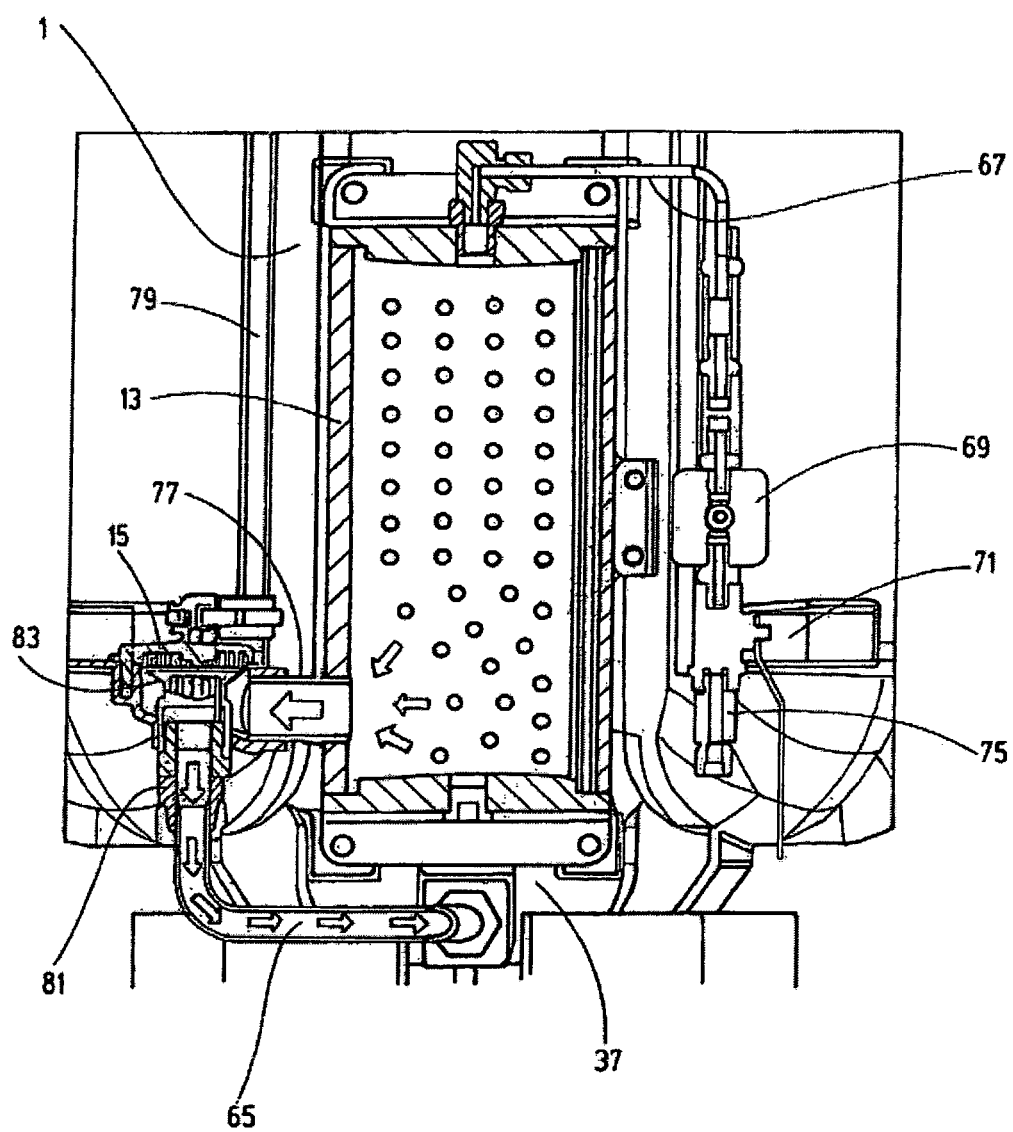
FIG. 6 is a side view in section of a flushing gas tank assigned to the embodiments of the filtering apparatus, drawn on a more enlarged scale in comparison with FIGS. 4 and 5, with the accompanying function components.

On the other hand, if the piston accumulator 19 is in the rotational position shown in FIG. 5 for a backwashing operation, the input 61 of the flushing gas channel 63 is connected to a flushing gas line 65 (see FIG. 6). To perform a backwashing, the piston 59 is driven upward by a supply of compressed air through the channel 63 to create a flow in the manner of a pressure surge from the filtrate in the cylinder space 47, thus creating a fluid flow that flows from the inside to the outside with a surge through the backwashing guide 45 and the chamber connection 29 on the clean side of the respective element chamber 3, flowing through the filter element 11 and thereby releasing the soiling, so that the backwashing quantity loaded with sludge goes through the chamber connection 25 to the backwashing output 51 and from there emerges through the opened ball valve 53 and the backwashing line 57. In the diagrams in FIGS. 1 and 2, the outlet flange 60 with the backwashing line 57 is shown lying on the front side of the apparatus, but the entire backwashing output 51, including the ball valve 53, the backwashing line 57 and flange 60, may be arranged in any positions on the housing 1 as needed because there is no drive connection between the rotatable piston accumulator 19 and the backwashing output 51.

Figure 7:
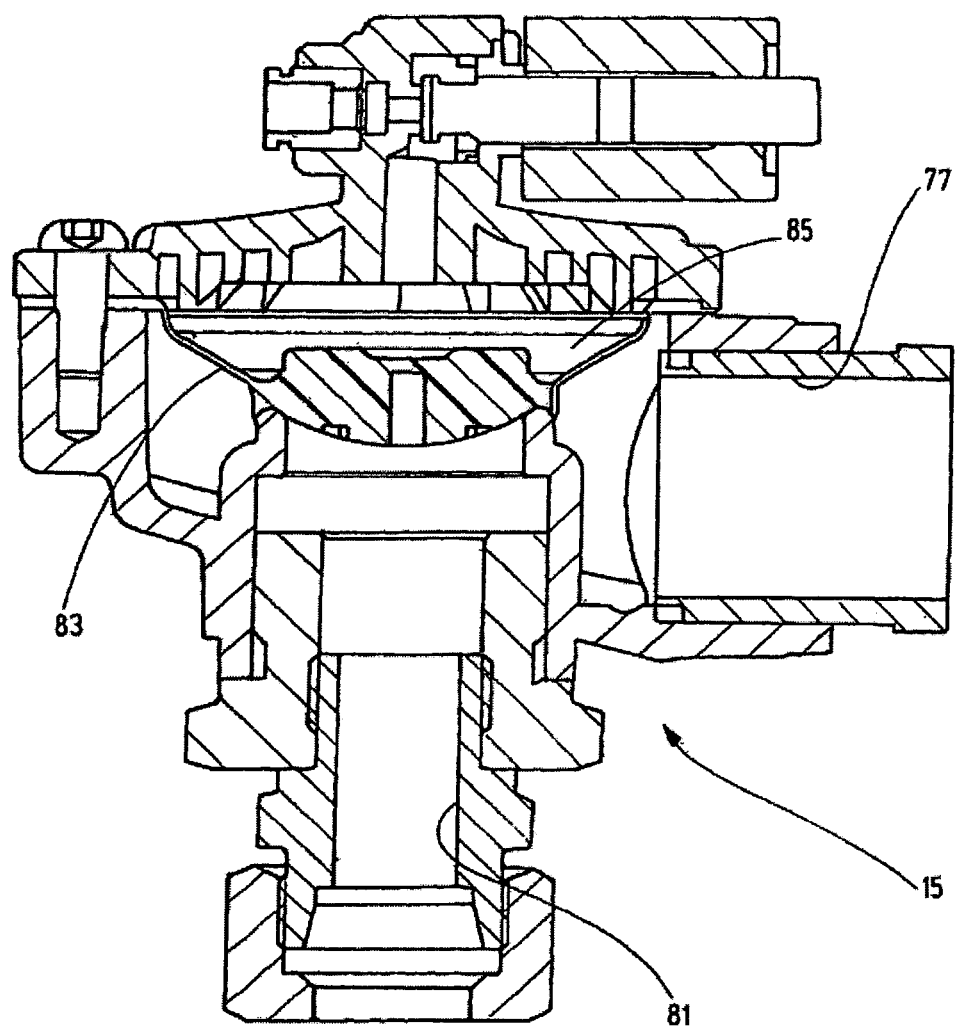
FIG. 7 is a side view in section of a diaphragm valve assigned to the flushing gas tank of FIG. 6, drawn on a more enlarged scale in comparison with FIG. 6.

FIGS. 6 and 7 show details of the compressed gas supplied. As already mentioned and as shown in FIG. 3, a flushing gas tank 13 is mounted on the rear side of the apparatus. The flushing gas tank 13 can be filled with compressed air through a pressure line 67 with an upstream pressure regulating valve 69 and a cutoff valve 71. The compressed air is supplied to the cutoff valve 71 from a compressed air line 73, which contains a nonreturn valve 75. To supply compressed air as a pressure surge through the flushing gas line 65 to the piston accumulator 19 from the flushing gas tank 13, a fast-opening valve is in the form of the diaphragm valve 15, which is pneumatically operable by a control line 79 and is provided at a connection 77 of the flushing gas tank 13. The diaphragm valve 15 shown in greater detail in FIG. 7 is connected to the flushing gas line 65 by a connection sleeve 81. FIG. 7 shows the diaphragm valve 15 in the closed position in which the diaphragm 83 is held in the closed position against the pressure of the flushing gas tank 13 prevailing at the connection 77. Valve 15 is kept in this position by a control pressure prevailing at the top side of the control space 85 situated in the diaphragm 83. In venting the control space 85, the diaphragm valve 15 opens quickly, so that the piston 59 of the piston accumulator 19 is moved suddenly for a backwashing operation by a compressed air pressure surge.

While various embodiments have been chosen to illustrate the invention, it will be understood by those skilled in the art that various changes and modifications can be made therein without departing from the scope of the invention as defined in the claims.

The invention claimed is:

1. A filtering apparatus, comprising:
   a filter housing having a filter inlet for fluid to be filtered and a filter outlet for filtered fluid;
   a plurality of filter elements in said filter housing, each said filter element having an effective filter surface and a clean side;
   a backwasher backwashing and cleaning said effective filter surface of at least one of said filter elements during a filtering operation;
   a pressure control device supporting backwashing by said backwasher, said pressure control device including a hydraulic accumulator having a clean fluid chamber fillable with a quantity of cleaned fluid during the filtering operation and connectable to said filter element being backwashed by said backwasher by a backwashing guide and having a gas chamber acted upon by a gas pressure for a backwashing operation to dispense the quantity of cleaned fluid at least partially from said clean fluid chamber and having a movable separation element between said clean fluid chamber and said gas chamber, movement of said separation element by the gas pressure dispensing the quantity of the cleaned fluid for the backwashing operation; and an overflow space being in fluid communication with said clean fluid chamber through a filling hole in a wall of said backwashing guide during the filtering operation, said filling hole having a graduated diameter forming a narrowing inlet opening directed toward said clean fluid chamber and filling said clean fluid chamber while said separation element moves in a direction away from said filling hole with an increasing volume of said clean fluid chamber.

2. A filtering apparatus according to claim 1 wherein said gas fluid chamber is connected to a compressed gas source by a control valve for the backwashing operation.

3. A filtering apparatus according to claim 2 wherein said compressed gas source comprises a flushing gas tank situated outside of said filter housing.

4. A filtering apparatus according to claim 2 wherein said control valve comprises a fast opening valve in a flushing gas line extending between and connecting said compressed gas source and said hydraulic accumulator.

5. A filtering apparatus according to claim 4 wherein said fast opening valve is a pneumatically operable diaphragm valve.

6. A filtering apparatus according to claim 1 wherein said hydraulic accumulator and said backwashing guide are connected to one another, are rotatably mounted in said filter housing and are rotated in said filter housing by a rotational drive for movement between filtering operation positions and a backwashing operation position.

7. A filtering apparatus according to claim 6 wherein said hydraulic accumulator comprises a piston accumulator with a cylinder and is rotatable about a cylinder axis of said cylinder together with said backwashing guide, said backwashing guide being arranged on one end of said cylinder.

8. A filtering apparatus according to claim 1 wherein said filter housing comprises a plurality of element chambers with one of said filter elements being in each of said element chambers, said element chambers being arranged on a circular line concentrically surrounding a cylinder axis of said filter housing.

9. A filtering apparatus according to claim 8 wherein said hydraulic accumulator is arranged between and is surrounded by said element chambers, said clean fluid chamber and said gas chamber being between chamber connections of said element chambers situated at the ends of said filter elements.

10. A filtering apparatus according to claim 9 wherein said filter housing comprises an input space having said filter inlet and forming an unfiltered side in the filtering operation and comprises an output space forming a filter side in the filtering operation and being connected to said filter outlet, said input space and said output space being in said filter housing between said hydraulic accumulator and being surrounded by said element chambers, said input space being connected to said chamber connection on said unfiltered side, said clean fluid chamber being connected to said chamber connection on a clean side of said element chambers in the filtering operation.

11. A filtering apparatus according to claim 10 wherein said overflow space is connected to said output space, said output space being connected to said clean fluid chamber for filling thereof.

12. A filtering apparatus according to claim 8 wherein said backwashing guide is connected to a chamber connection on a clean side of one of said element chambers being backwashed in a rotational position of said hydraulic accumulator corresponding to the backwashing operation of said one of said element chambers; and a backwashing arm is rotatable in said filter housing with said hydraulic accumulator, is situated on an end of a cylinder of said hydraulic accumulator opposite said backwashing guide and is connected to a chamber connection on a crude side of said one of said element chambers being backwashed and to said backwashing arm for outflow of a backwashing quantity during the backwashing operation.

13. A filtering apparatus according to claim 12 wherein said backwashing arm is connected to a backwashing line by a motor-operated backwashing valve.

14. A filtering apparatus according to claim 13 wherein said backwashing valve comprises a ball valve.

* * * * *